A. I. GRIGGS.
Stove Board.

No. 9,486. Reissued Dec. 7, 1880.

WITNESSES:

Chas. Nide
C. Sedgwick

INVENTOR:
A. I. Griggs
BY Munn & Co
ATTORNEYS.

N. PETERS, PHOTO-LITHOGRAPHER, WASHINGTON, D. C.

UNITED STATES PATENT OFFICE.

A. IRVING GRIGGS, OF NEW YORK, N. Y.

STOVE-BOARD.

SPECIFICATION forming part of Reissued Letters Patent No. 9,486, dated December 7, 1880.

Original No. 230,002, dated July 13, 1880. Application for reissue filed October 14, 1880

*To all whom it may concern:*

Be it known that I, A. IRVING GRIGGS, of the city, county, and State of New York, have invented a new and useful Improvement in Stove-Boards, of which the following is a specification.

Figure 1:
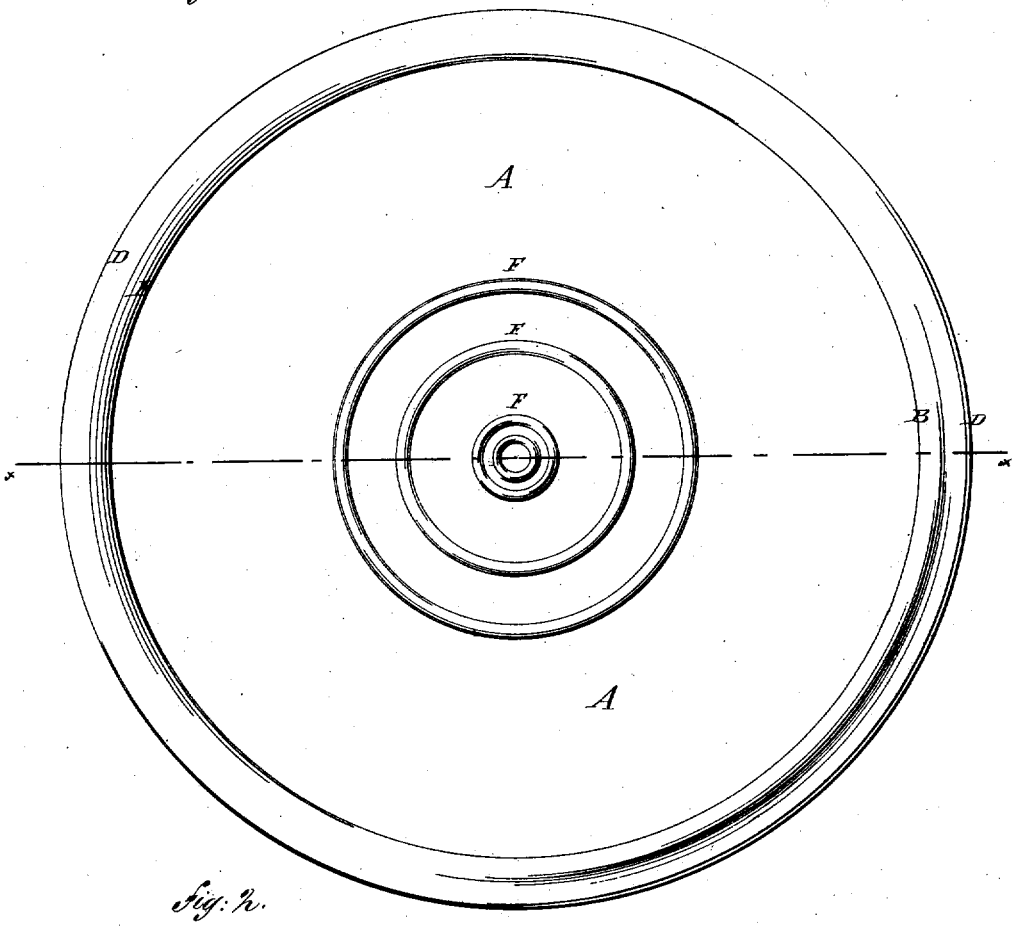
Figure 2:
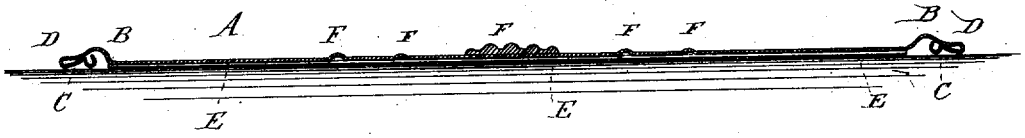

Figure 1 is a plan view of the improvement. Fig. 2 is a sectional elevation taken through the line *x x*, Fig. 1.

Similar letters of reference indicate corresponding parts.

The object of this invention is to furnish stove-boards so constructed that they will not be twisted, warped, or drawn out of shape in shipping, selling, or in use, and will thus lie level upon the floor.

The invention consists in constructing a stove-board made with a bead and a hem, and having the lower ply of the hem corrugated and its edge turned up against the plate within the cavity of the bead, and the veneer cemented to the lower side of the middle part of the plate, as will be hereinafter fully described.

A represents a plate of zinc of any desired size. Around the plate A, at a little distance from its edge, is formed a bead, B. The edge of the plate A is turned under upon itself, or hemmed, and the under ply, C, of the hem D is corrugated, as shown in Fig. 2, and its edge is turned up against the plate A in the cavity of the bead B. The corrugation of the lower ply, C, of the hem D stiffens and strengthens the said hem and prevents the board from being twisted, warped, or drawn out of shape while being handled and displayed for sale, so that it will lie smoothly upon the floor.

To the under side of the middle part or body of the plate A is secured, by paste or other cement, a veneer, E, or thin plate of wood.

In making the stove-board the bead B is so formed that the veneer E and the corrugated lower ply, C, of the hem D may rest smoothly upon the floor.

If desired, beads F may be formed around the center of the plate A, as shown in Figs. 1 and 2.

By this construction a neat, ornamental, and serviceable stove-board is produced, which will not be drawn out of shape by use.

Having thus described my invention, I claim as new and desire to secure by Letters Patent—

1. A stove-board constructed, substantially as herein shown and described, of the zinc plate A, with a bead, B, and a hem, D, and having the lower ply, C, of the hem D corrugated and its edge turned up against the plate A within the cavity of the bead B, and the veneer E cemented to the lower side of the plate A, as set forth.

2. A zinc stove-board having the edge on the outside of bead B turned under on a curve at the circumference, then formed with an upward annular corrugation in the bottom ply, C, and finally carried up on a curve against the underside of bead, as shown and described.

A. IRVING GRIGGS.

Witnesses:

JAMES T. GRAHAM,

C. SEDGWICK.